United States Patent [19]
Casey et al.

[11] Patent Number: 5,999,273
[45] Date of Patent: Dec. 7, 1999

[54] SOLID AREA TONER REDUCTION TO MAXIMIZE PROCESS LATITUDE

[75] Inventors: Brendan C. Casey, Webster; Joseph W. Ward, Pittsford, both of N.Y.

[73] Assignee: Xerox Corporation, Stamford, Conn.

[21] Appl. No.: 08/376,547

[22] Filed: Jan. 23, 1995

Related U.S. Application Data

[63] Continuation of application No. 07/941,462, Sep. 8, 1992, abandoned.

[51] Int. Cl.$^6$ .............. H04N 1/21; H04N 1/40; B41J 2/385
[52] U.S. Cl. ............ 358/298; 358/456; 358/458; 347/131; 347/240; 347/251; 347/254
[58] Field of Search ............ 358/298, 456, 358/457, 459; 395/109; 382/54, 55; 347/131, 132, 240, 251, 252, 254; 355/246, 208

[56] References Cited

U.S. PATENT DOCUMENTS

| | | | |
|---|---|---|---|
| 3,573,789 | 4/1971 | Sharp et al. | 340/324 |
| 4,437,122 | 3/1984 | Walsh et al. | 358/166 |
| 4,450,483 | 5/1984 | Coviells | 358/166 |
| 4,700,201 | 10/1987 | Sato | 358/298 X |
| 4,967,211 | 10/1990 | Colby et al. | 346/160 |
| 5,162,820 | 11/1992 | Yamamoto et al. | 346/160 X |
| 5,226,096 | 7/1993 | Fan | 382/54 X |
| 5,270,827 | 12/1993 | Kobayashi et al. | 346/160 X |
| 5,299,308 | 3/1994 | Suzuki et al. | 395/109 X |

*Primary Examiner*—Randy W. Gibson
*Attorney, Agent, or Firm*—Ronald F. Chapuran

[57] ABSTRACT

A method of decreasing toner in solid area development to improve the latitude of a xerographic process in a machine having a projecting system for modulating a beam and projecting an image onto an imaging surface by specifying pixels defining solid image areas and selectively modulating the beam with regard to the specified pixels to change the state of the pixels from black to gray or partial white.

4 Claims, 6 Drawing Sheets

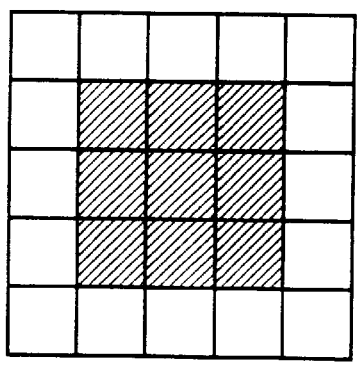
FIG. 6A
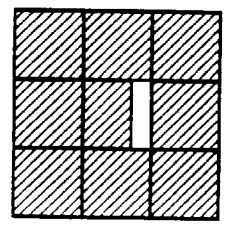
FIG. 6B
FIG. 6C
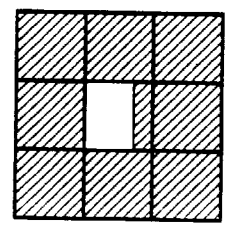
FIG. 7A
FIG. 7B
FIG. 7C

SOLID AREA TONER REDUCTION TO MAXIMIZE PROCESS LATITUDE

This is a continuation of application Ser. No. 07/941,462, filed Sep. 8, 1992 abandoned.

BACKGROUND OF THE INVENTION

The invention relates to optimization of xerographic process latitude, and more particularly, to the reduction of toner mass in solid area development to improve developer and fuser latitude.

One benchmark in the suitable development by toner particles of a latent electrostatic image on a photoreceptor is the correct relationship of toner concentration in the developer to the tribo electric charge between the carrier and toner. An incorrect relationship, i.e. too much toner concentration, can result in too much background in the developed image. That is, the white background of an image becoming gray. On the other hand, too little toner concentration can result in deletions or lack of toner coverage of the image.

Another benchmark is heat transfer and toner offset (toner sticking to the fuser roll) in the fusing process. The fusing of the toner to a copy sheet takes place when the proper combination of heat, pressure and contact time are provided.

During operation of some fusing systems, the support member is moved through the nip formed by a roll pair. By controlling the heat transfer to the toner, virtually no offset of the toner particles from the copy sheet to the fuser member is experienced under normal conditions. This is because the heat applied to the surface of the fuser member is insufficient to raise the temperature of the surface of the member above the "hot offset" temperature of the toner at which temperature the toner particles in the image areas of the toner liquefy and cause a splitting in the molten toner resulting in "hot offset". Too little heat applied to the surface, however, to eliminate offset can result in insufficient fusing of toner to paper. The amount of heat transferred, therefore, can be neither too high (resulting in toner offset) or too low. Xerographic system latitude is defined by the degree to which the system can properly develop and fuse and image based upon the above variables.

One difficulty with prior art systems has been that to avoid deletions in the processed image, a relatively high toner concentration was required. However, operating at a relatively high toner concentration, the developed mass or toner mass per unit area was beyond the allowable latitude of the fuser resulting in toner offset and unacceptable fused images.

Digital Image manipulation is well known in the prior art. For example, Sharp U.S. Pat. No. 3,573,789 shows a resolution conversion technique by shifting each pixel with surrounding pixels into a resolution expander that automatically produces a multiple number of pixels corresponding to the center pixel. Image enhancement techniques to improve the quality of the image are also well known. For example, Coviello 4,450,483 statistically analyses a pixel with its surrounding pixels to make a determination whether or not the center pixel should remain as a black or white pixel or be changed to either a black or white pixel to improve the quality of the overall image. Walsh Patent 4,437,122 does image enhancement of a digital image by taking each pixel of the digital image and a neighborhood surrounding the pixel and comparing this pattern to a set of reference patterns. Depending upon the match between the pixel and its neighborhood with a particular pattern, the center pixel is expanded into a plurality of predetermined pixels enhancing the overall quality of the image. However, these systems do not consider the problem of potentially conflicting fuser and development latitudes in a xerographic system.

It would be desirable, therefore, to provide a technique to increase xerographic process latitude by the selective reduction of toner in solid area development. It would also be desirable to increase overlapping developer and fuser latitude in the xerographic process by the manipulation of pixels defining the solid area of an image.

It is an object of the present invention therefore to provide a new an improved technique for the selective reduction of toner in solid area development. It is another object of the present invention to selectively alter pixels defining the solid area of an image to improve the xerographic process latitude. It is still another object of the present invention to selectively modulate pixels defining a solid black area of an image to change black pixels to grey Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of decreasing toner in solid area development to improve the latitude of a xerographic process in a machine having a projecting system for modulating a beam and projecting an image onto an imaging surface by specifying pixels defining solid image areas and selectively modulating the beam with regard to the specified pixels to change the state of the pixels from black to gray or partial white.

For a better understanding of the present invention, reference may be had to the accompanying drawings wherein the same reference numerals have been applied to like parts and wherein:

DETAILED DESCRIPTION OF THE DRAWINGS

FIGS. 6a–6c illustrate latitude improvement through pixel modulation in accordance with the present invention; and FIGS. 7a–7c illustrate toner reduction on a developed image through pixel modulation in accordance with the present invention.

DETAILED DESCRIPTION OF THE PREFERRED EMBODIMENT

Figure 1:
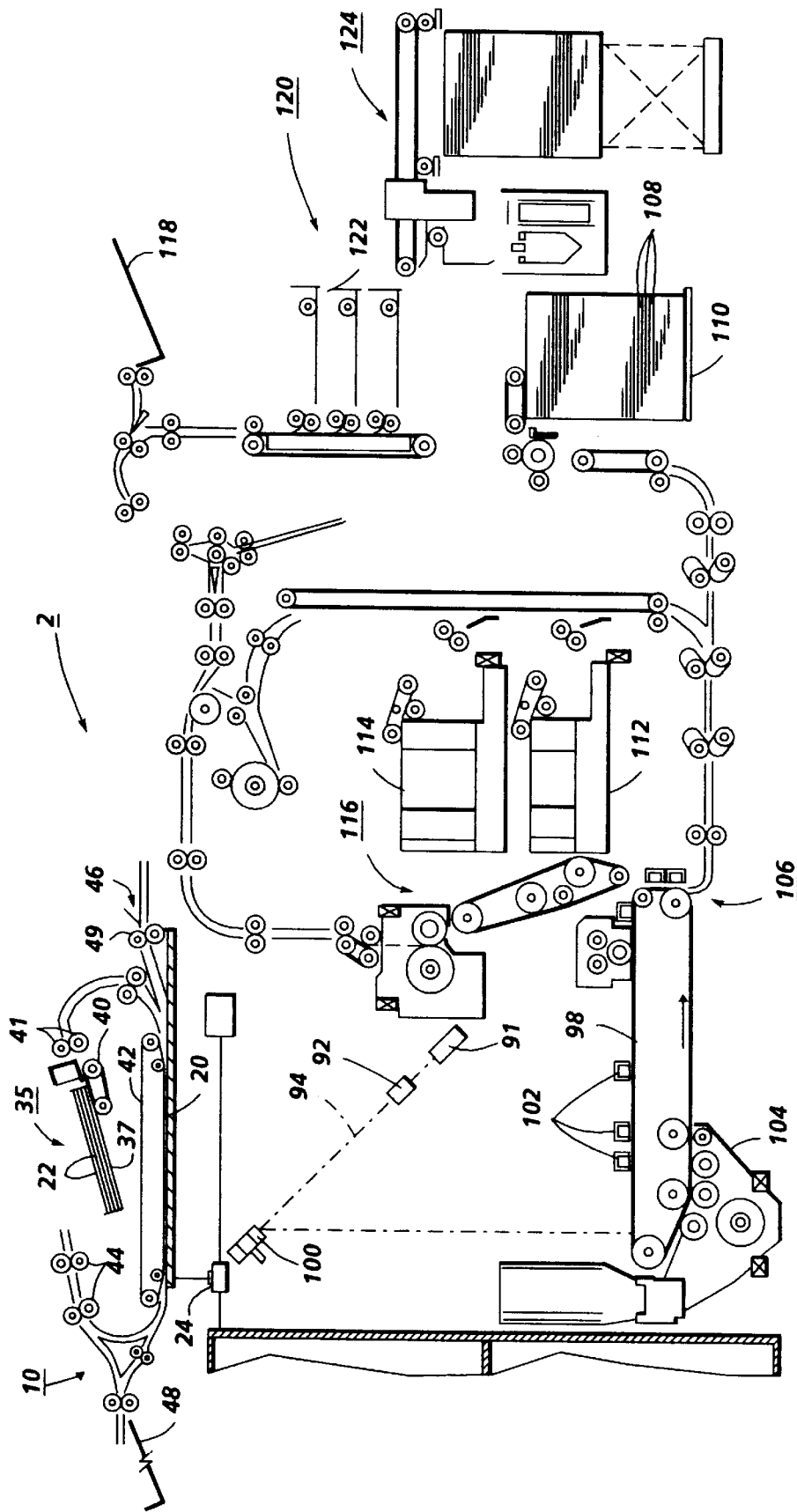
FIG. 1 is a plan view illustrating a typical electronic imaging system incorporating toner reduction to maximizing process latitude.
Figure 2:
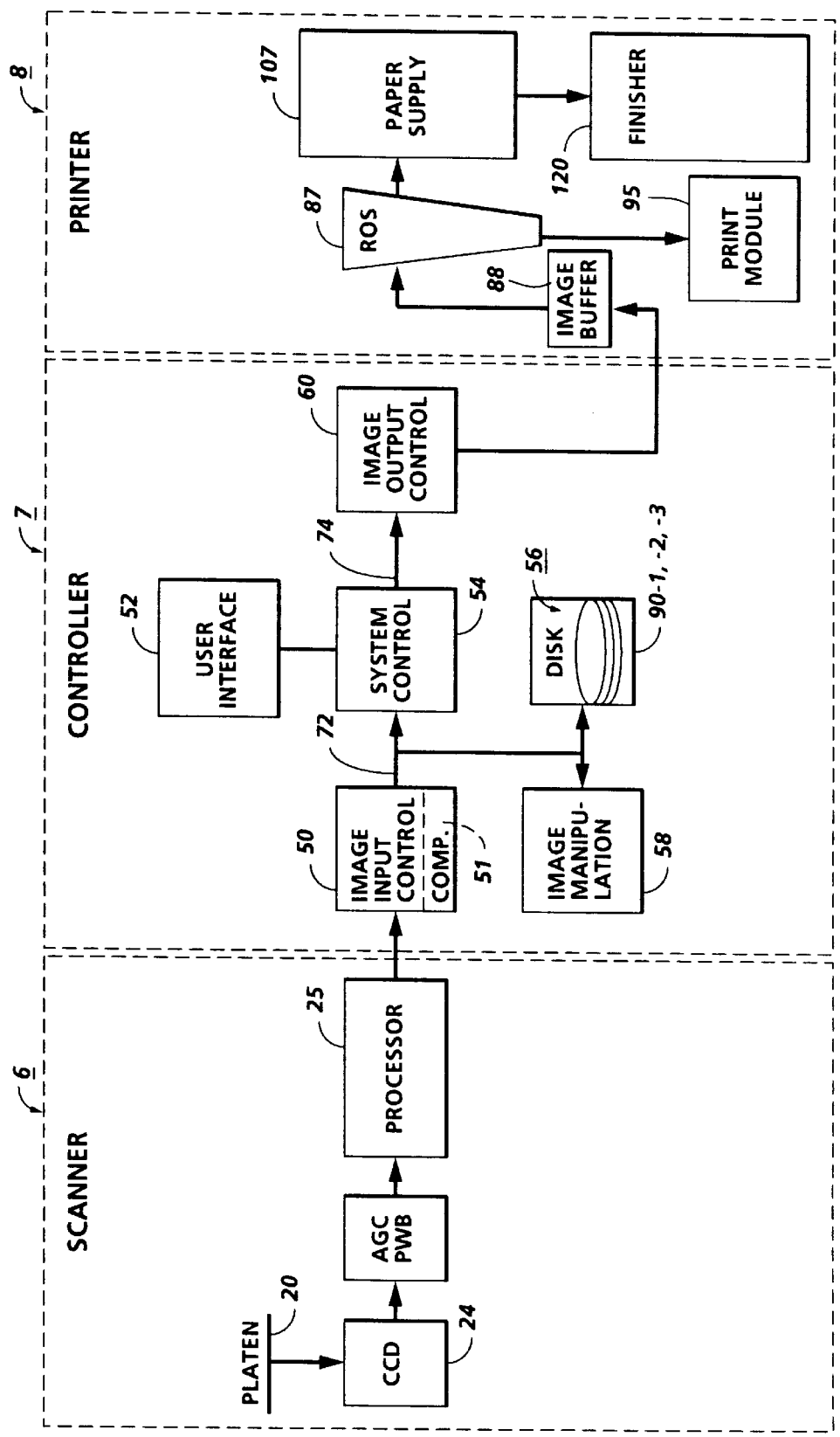
FIG. 2 is a block diagram depicting the major elements of the imaging system shown in FIG. 1.

Referring to FIGS. 1 and 2, there is shown an exemplary electronic imaging system 2 in accordance with the teachings of the present invention. Imaging system 2, for purposes of explanation, is divided into a scanner section 6, controller section 7, and printer section 8. While a specific printing system is shown and described, the present invention may be used with other types of printing systems, such as ink jet, ionographic, etc.

Scanner section 6 incorporates a transparent platen 20 on which the document 22 to be scanned is located. One or more linear arrays 24 are supported for reciprocating scanning movement below platen 20. A suitable (not shown) lens and mirrors cooperate to focus the array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35, operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44

Printer section 8 comprises a laser type printer and, for purposes of explanation, is separated into a Raster Output Scanner (ROS) section 87 with image buffer electronics 88. Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotron 102 at a charging station preparatory to exposure by imaging beams 94. It should be noted that it is within the scope of the present invention to use any type of image receiving member or surface or projecting system as appropriate for example, for ionographic or ink jet systems.

The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116, and the resulting prints discharged to either output tray 118, or to finisher 120. Finisher 120 could include a stitcher 122 for stitching or stapling the prints together to form books and a thermal binder 124 for adhesively binding the prints into books.

Controller section 7 is, for explanation purposes, divided into an image input controller 50, User Interface (UI) 52, system controller 54, main memory 56, image manipulation section 58 and image output controller 60. The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in a not shown system memory which comprises a Random Access Memory or RAM pending transfer to main memory 56 where the data is held pending use.

UI 52 includes a combined operator controller/CRT display consisting of an interactive touchscreen, keyboard, and mouse. UI 52 interfaces the operator with printing system 2, enabling the operator to program print jobs and other instructions, to obtain system operating information, instructions, programming information, diagnostic information, etc. Items displayed on the touchscreen such as files and icons are actuated by either touching the displayed item on the screen with a finger or by using a mouse to point a cursor to the item selected and keying the mouse. Main memory 56 has plural hard disks 90-1, 90-2, 90-3 for storing machine Operating System software, machine operating data, and the scanned image data currently being processed.

When the compressed image data in main memory 56 requires further processing, or is required for display on the touchscreen of UI 52, or is required by printer section 8, the data is accessed in main memory 56. Where further processing other than that provided by processor 25 is required, the data is transferred to image manipulation section 58 where the additional processing steps such as collation, make ready, decomposition, etc. are carried out. Following processing, the data may be returned to main memory 56, sent to UI 52 for display, or sent to image output controller 60.

Image data output to image output controller 60 is decompressed and readied for printing by not shown image generating processors. Following this, the data is output by suitable dispatch processors to printer section 8. Image data sent to printer section 8 for printing is normally purged from memory 56 to make room for new image data. Within Printer 8, image data is buffered and synchronized within Image buffer Electronics 88 for delivery to and modification within the RO 87. For additional control detail, reference is made to U.S. Pat. Nos. 5,081,494, 5,091,971 and 4,686,542 incorporated herein.

The exemplary and preferred embodiment for the present invention comprises a digital image manipulation method that utilizes a collection of neighborhood pixels surrounding a central pixel under evaluation for the purpose of expanding said central pixel into a plurality of subpixels, partial pixels, fractional pixels, or "gray-level" pixels, or the like, and furthermore redefining said original central pixel by reassigning to it a certain "value" "weight" or "level" within the newly defined class of plurality of subpixels, based upon the evaluation of pixel properties or patterns in the neighborhood. A significant feature and advantage at this invention is that it may be easily incorporated, or inserted, into a convenient location along the digital image datastream at relatively low cost, without otherwise disrupting or impacting the remainder of the reprographic printing system. The processing electronics for the present invention has been adapted to and incorporated within the image Buffer Electronics 88 in the Printer 8.

Figure 3:
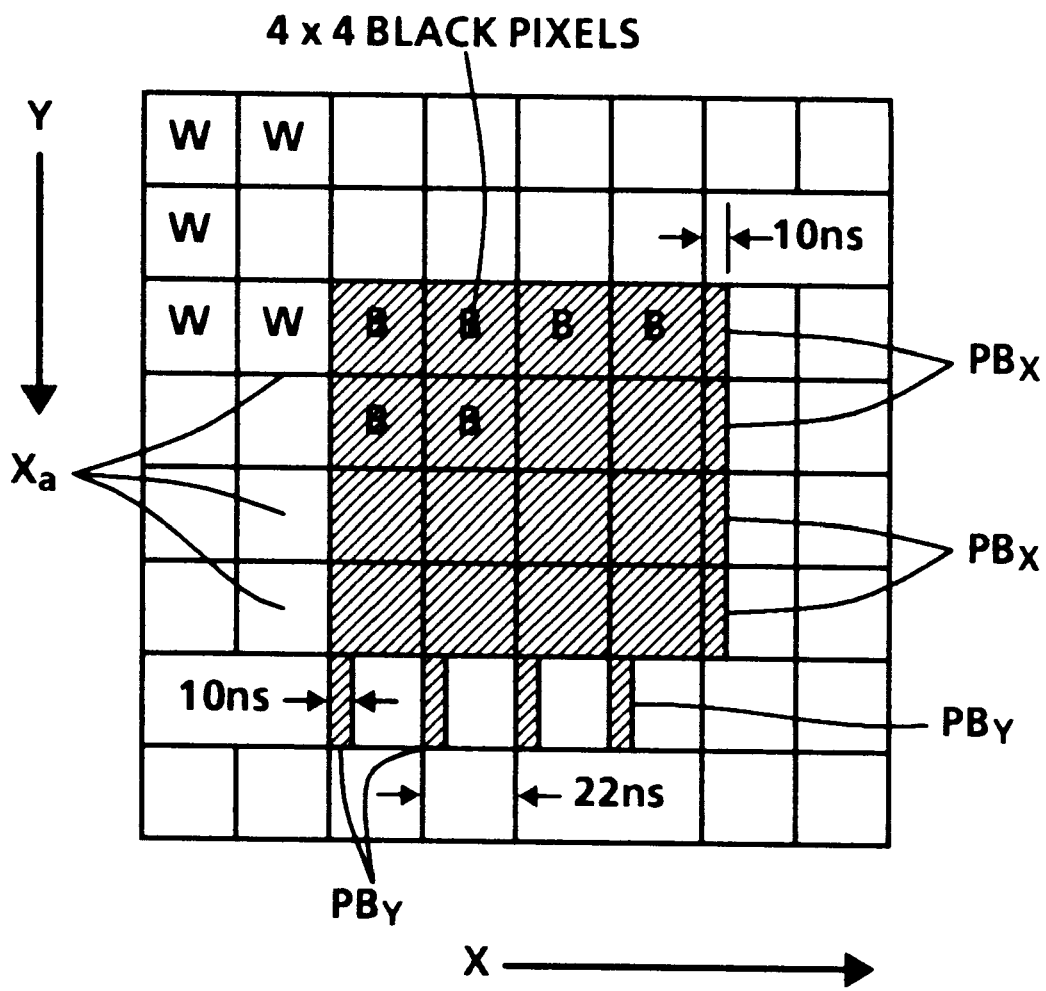
FIG. 3 illustrates partial pixel modulation.

With respect to FIG. 3 partial pixel modulation is generally shown. In particular, there is illustrated a portion of a scanned image, each square representing either a black or white pixel. As shown in FIG. 3, there is a 4×4 black pixel area surrounded by a white pixel area. The process of reproducing an image that is a faithful reproduction of the original image requires that the original image be converted to light and dark spots (i.e. ordered sequences of W or B pixels scanned rapidly in the X-direction, followed repetitively by new successive sequences of W or B pixels in the Y-direction) that are used to modulate a laser beam scanning an image receiver. The image on the receiver is then developed with toner and transferred to a copy sheet for fusing. Within this operation, often times black lines or black areas can be too constricted or too wide.

If the black line width in the X-direction is too narrow, it would be desirable to increase the width of the black area in the X-direction. By suitable modulating of the laser scanner, as the laser scans in the X-direction, the width of the black line can be increased in the X-direction.

This is accomplished by extending the modulation of the beam for a black dot for a portion of time-the beam is sweeping an area that should be a white dot. For example, assume that the time length or period for scan of a pixel in the X-direction is 22 nanoseconds. Then, by extending the black pixel for a period of time, for example, 10 nanoseconds, into a white pixel area, it is possible to extend the black area and in effect widen the black line in the X-direction. This is illustrated in FIG. 3 with respect to the partial black dot areas PB$_x$ as shown in the normally white pixel areas. It should be noted that the 10 nanoseconds is merely exemplary and not to scale, and various sized partial pixels are contemplated within the scope of the invention. It should also be noted that the same effect could be achieved by initiating the black pixel area in the white pixel area preceding the black area, for example, locations Xa. It should also be noted that the same principle applies to decreasing the width of a black line in the X-direction by merely decreasing the time period that the scanning beam is modulated for a black pixel.

In a similar manner, there can be a change in modulation of the laser beam in the Y-direction or the slow-scan direction as illustrated. In this case, the effect of an increase in the width of the black line in the Y-direction is shown as being achieved by scanning partial black dots PBY as illustrated. That is, partial black pixels in each next adjoining pixel area to the black pixels in the Y-direction are provided. Typically, a 10 to 12 nanosecond or any other suitable time period for the black pixel in the X-direction is provided to increase line width in the Y-direction.

Figure 4:
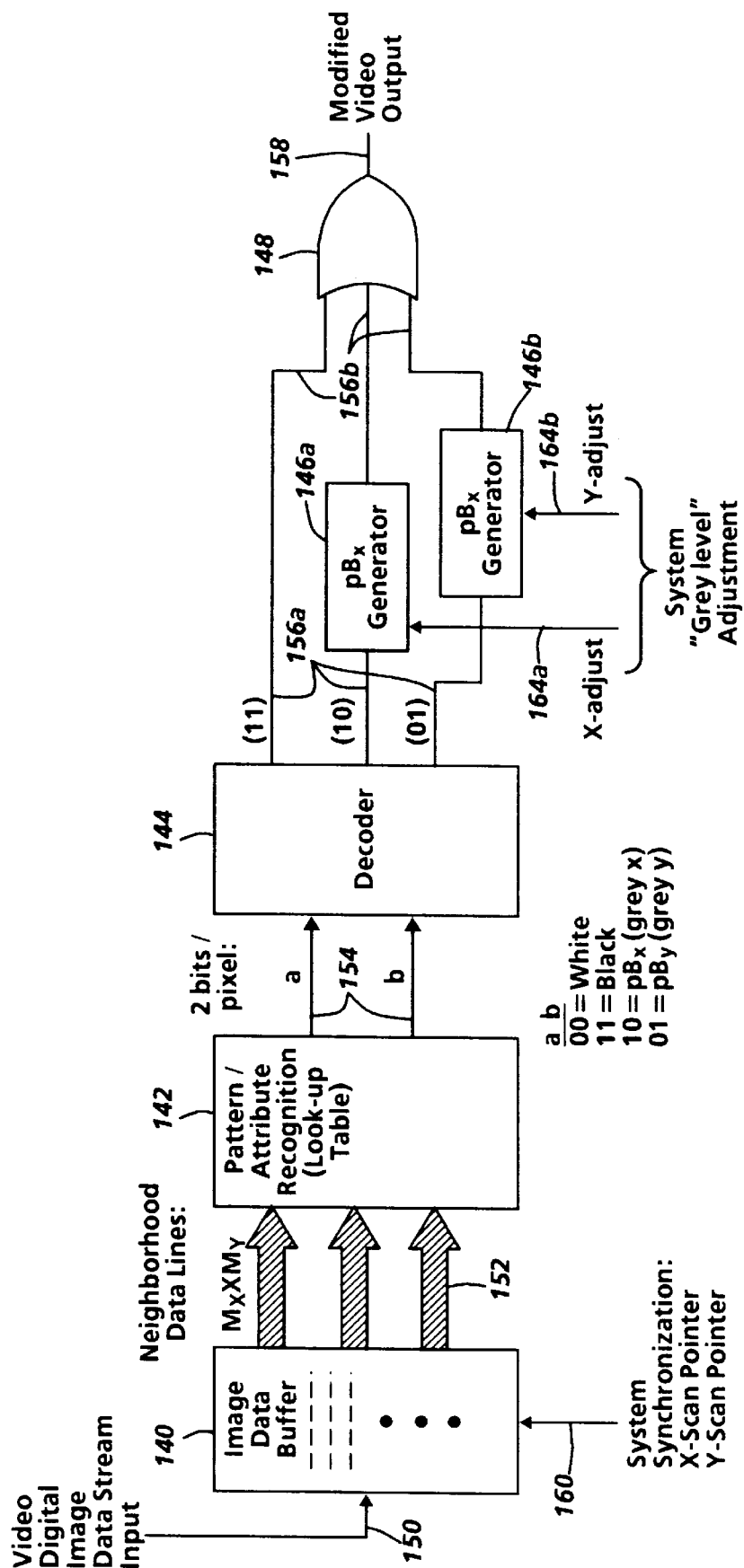
FIG. 4 illustrates a real time hardware implementation of printer process latitude compensation by pixel modulation.

FIG. 4 illustrates an exemplary implementation of electronic logic functional blocks which collectively are capable of providing the essential digital image monitoring, pattern/property recognition, and decoding and modulation means to produce the desired process latitude adjustments according to the requirements of the present invention. Said functional electronic hardware has been adapted and implemented to process the serial digital image datastream and deliver appropriately modulated serial video output in real time at extremely high data rates (in excess of 100 million bits (or pixels) per second. For convenience, this digital image alteration scheme and process has been described by its inventors as "Pixel Realtime Image Modulation Enhancement" Processing, and so named "Prime" Processing for easy reference.

As shown in FIG. 4, a high speed video digital image datastream 150 is delivered to temporary image data buffer storage block 140, which collects and temporarily holds the most recent group, My of x-scan lines(or rows) of digital image data. Printer system control pointers, 160, comprising an x-scan pointer, and a y-scan pointer with other required control functions, dynamically scan through the Image Buffer 140 in the x-scan direction (at the pixel clocking rate) and successively updates and scrolls the y-scan buffers in synchronism with the Printer Imaging Timing and ROS scanning operation.

As the result of the just described operation within the Image Buffer block 140, there is, for each x-scan pixel clock period, a new set of data presented to the ordered group of output data lines 152, which define the state (B or W), of the present data pixel bit under evaluation plus the statue of all its surrounding neighborhood pixels extending bidirectionally in x- and y-directions over a desired region generally encompassed by $n_x$ x My. Said data lines 152 collectively form unique patterns of 1's and 0's for each image pixel neighborhood topography, and these are presented to an image pattern or image attribute recognition block 142, which in turn produces a new output data code 154 based upon the desired output response to each particular image pattern at 152 which may occur. In its most direct implementation, block 192 may be a look-up table, which is easily incorporated in a memory matrix or a random-access memory table, or the like, where data lines 152 are assigned to input address lines, and output lines 154 are data lines from the memory matrix. Any number of output data lines 154 may be assigned or provided, according to particular need, for the exemplary embodiment of the present invention.

As earlier described with reference to FIG. 3, it may be desired in the faithful reproduction of an original image to generate a set of partial or gray PBX, and PBY, in addition to B and W pixels. These may be presented directly as outputs from block 142, in which case (3) three output lines would emanate at 154, as B, PBX, and PBY (where W is the negation or absence of B); otherwise these states maybe encoded into fewer lines from block 142, and later decoded within a following block 144 into the desired individual lines, and thus save or compress available storage space within matrix 142. In the latter case, for the exemplary embodiment, two bits, a and b, per image data pixel exit block 142 as lines 154, where for convenience the unique two bit patterns are assigned the various desired possible pixel output values, 00 being a white (W) pixel, 11 being a black (B) pixel, 10 being a partial black, or gray, pixel in the x-scan direction (PB$_x$), and 01 being a partial black or grey, pixel in the y-scan direction (PBY). These pixel states are output as 3 individual lines 156a from decoder 144 in FIG. 4, and the latter two lines, PBX and PBY are connected to enable, or activate, respectively, similar but separate functions, PX$_x$ generator block 146a, and PBY generator 146b. These respective blocks actually produce the desired modulated partial black or gray pixels, PBX and PBY, as shown in FIG. 3, where the degree of black or "gray level", is ascribed in the desired amount by the system controller, not shown, via gray level adjust lines: x-adjust 164a, and y-adjust 164b respectively. Since output states 156a are exclusive for each pixeltime period, the active signal at 156b passes via or gate 148 to the recombinedd modified video image data stream output 158.

Figure 5A:
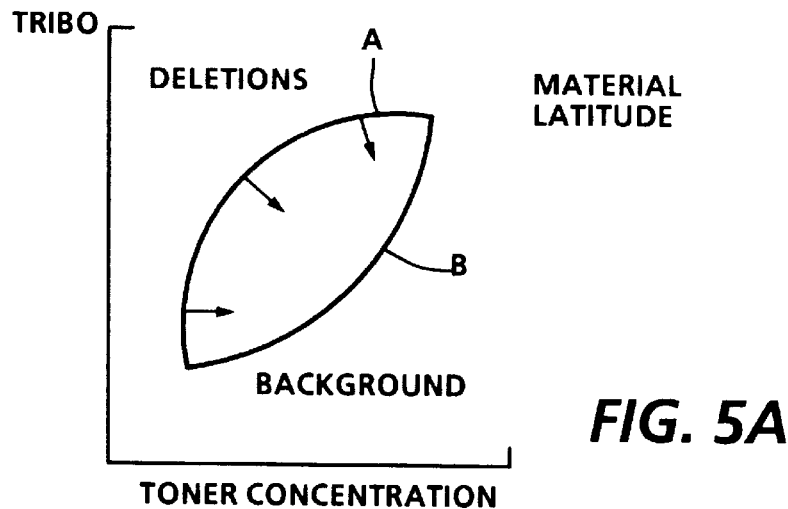
FIGS. 5a–5c illustrate xerographic process latitude improvement in accordance with the present invention.

In accordance with the present invention, as discussed above, for efficient operation and acceptable quality in a xerographic process, several process steps must be controlled. Often one process step can adversely affect another process step. For example, providing sufficient latitude in the developer process might adversely affect the degree of latitude needed in the fuser process. This can be illustrated with reference to FIGS. 5A and 5B. FIG. 5A shows a typical relationship of toner concentration along the X axis with respect to tribo electric charge illustrated along the Y axis. As is well known, the tribo electric charge is the relative electrostatic force or attraction between toner in the developer system and the carrier beads making up the developer material. The toner concentration in the developer is the ratio of the weight of the toner with respect to the weight of the toner plus the carriers beads.

The ideal relationship for suitable development within the xerographic process is shown by the eliptically shaped area defined by arcs A and B. An acceptable development process is a relationship of tribo electricity to toner concentration within the defined area. An excessively high concentration of toner with respect to the tribo charge results in to much gray in white background areas on the developed image as generally shown as "background" region in FIG. 5A. On the other hand, a relatively low toner concentration with respect to the tribo electric charge results in insufficient development or deletions on the developed image as shown in FIG. 5A by "deletions" region. The arc "A" generally represents the minimum toner concentration acceptable for given tribo electric charge in the system. Moving from arc A toward arc B as illustrated by the arrows generally indicates an increasing toner mass on the developed image on paper per unit area.

Figure 5B:
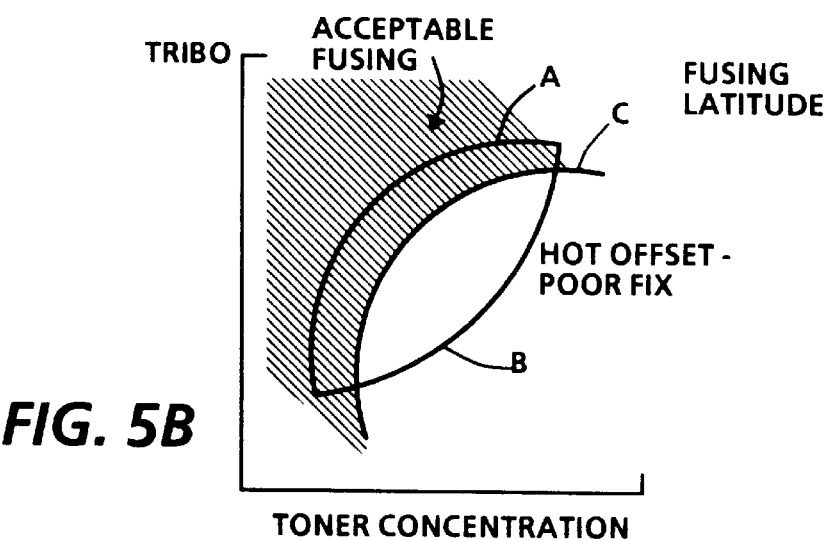

As discussed above, too much developed mass or weight of toner on paper per unit area of the image adversely affects the fusing process leading to poor fusing and hot offsetting or sticking of the toner to the fuser roll rather than to the copy sheet. FIG. 5B, illustrates a typical acceptable fusing latitude as defined by the shaded area superimposed on the acceptable developer latitude. The arc C shown on FIG. 5B illustrates the limit of acceptable fusing as determined by toner mass. The area defined by the curves A and C represents a relatively narrow process latitude taking into account the material latitude of the developer and the acceptable latitude of the fuser.

Figure 5C:
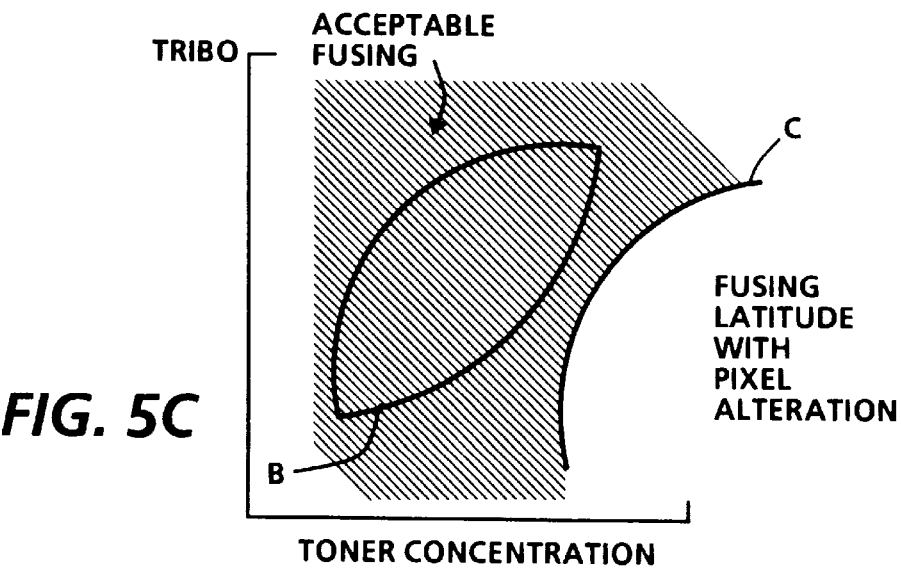

In accordance with the present invention, as illustrated in FIG. 5C, the arc C representing the boundary of acceptable toner mass in the fusing process is moved beyond arc B, the acceptable developer latitude, to significantly increase the process latitude acceptable in both the developer operation as well as the fuser operation. Decreasing the photoreceptor developer voltage and running at a higher toner concentration to overlap the fuser and developer latitudes has been shown to result in an inadequate fine line development. The solution is simply to analyze the video stream coming to the printer and reduce solid area development.

This is achieved by inserting partial black or gray pixels into a black field at appropriate intervals to reduce the developed mass per unit area of solid areas. This has the effect of reducing the photoreceptor developer voltage for solids while leaving sufficient photoreceptor developer voltage for lines, particularly fine lines at a higher level. The net result is to allow the fuser and developer latitudes to overlapas shown by FIG. 5C.

In a preferred embodiment, a 3×3 matrix of pixels is stored and analyzed, and if all the pixels are black, the center pixel is made into an essentially gray pixel. That is, the center pixel is a partial pixel in that it is black for a portion of time and white for the remaining portion of time. The proportion of time or ratio of black to white of this partial pixel its gray level is adjustable and can be selected to maximize the process latitude. This partial black or gray pixel procedure decreases the developed mass per unit area of solids but fine lines are not affected. In addition, the use of partial pixels to reduce the developed mass per unit area does not significantly increase solid area graininess. The solid area graininess limit is still outside the latitude as defined by the deletion boundary in FIG. 5A. This solution provides the system latitude necessary for process control to maintain operation within both the development process and the fuser latitude window as illustrated in FIG. 5C.

The procedure is illustrated with respect to FIGS. 6A–6C with FIG. 6A showing a 5×5 matrix of pixels being either black B or white W. As shown, a 3×3 matrix of pixels is exclusively black with the center black pixel being B1. In accordance with the present invention, upon the recognition of a target or center pixel as B1 surrounded by black pixels, the center pixel is made partially white as illustrated in FIGS. 6B and 6C. As described above, a black pixel can be made partially white by a suitable modulation of the modulator of the beam scanning the black and white pixels. It should be understood that although the example is a 3×3 matrix of black pixels, any grouping of pixels about a target or center pixel can be used in the practice of the invention. It is also conceivable that modifications of the invention and the degree of changing the target pixel could be a function of an asymmetrical disposition of pixels about a target pixel and even allow for an occasional white pixel in the selected neighborhood about the center or target pixel.

It should also be understood that the degree of relative blackness or whiteness of the target pixel is a matter of choice as illustrated in FIG. 7. FIG. 7A shows the 3×3 black matrix of FIG. 6A with FIGS. 7B and 7C illustrating different degrees of a partial white area for the target pixel. In a preferred embodiment, partial pixels are not provided in an adjoining relationship either in the x or y direction. Thus, if the scanning system as described above is a dual beam system, avoiding adjacent partial pixels in the Y direction can be accomplished by providing the partial pixels only on one of the dual scanning beams. In the X direction, avoiding adjacent partial pixels is accomplished by the modulation of each particular beam to provide a partial pixel only on every other pixel, or less frequently if desired.

It should be understood, however, that the scope of the present invention is intended to cover any embodiment that provides white areas or partial white pixels within black areas to reduce the toner mass per unit area development.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a printing machine having an imaging surface and process operations including a projecting system for projecting an image onto the imaging surface for toner development and transfer of the image to a medium for fixing the image to the medium in a fuser, the image comprising discrete pixels of first or second states, the toner development and image fixing operations being subject to process latitudes, a method of toner development of the projected image to improve the development and image fixing process latitudes comprising the steps of;

holding in a memory a group of pixels of the image to be projected, the group of pixels being a target pixel and a set of neighboring pixels surrounding, the target pixel, recognizing the state of the target pixel and the states of predetermined neighboring pixels surrounding the target pixel, recognizing a degree of a gray level adjustment, and responding to the state of the target pixel and the predetermined neighboring pixels and to the degree of the gray level adjustment to change the state of a portion of the target pixel whereby to change the amount of toner applied to the target pixel and improve the development and image fixing process latitudes.

2. The method of claim 1 wherein the projecting system includes a beam modulator and wherein the step of changing the state of a portion of the target pixel includes the step of adjusting the timing of the beam modulator.

3. The method of claim 1 wherein the first and second states are black and white and the step of changing a portion of the target pixel includes the step of making the target pixel partially white and partially black.

4. The method of claim 1 wherein the step of changing a portion of the target pixel includes the step of decreasing the amount of toner applied to the target pixel.

* * * * *